United States Patent
Sano et al.

(10) Patent No.: US 7,923,968 B2
(45) Date of Patent: Apr. 12, 2011

(54) CHARGE AND DISCHARGE CONTROL CIRCUIT AND RECHARGEABLE POWER SUPPLY DEVICE

(75) Inventors: Kazuaki Sano, Chiba (JP); Kiyoshi Yoshikawa, Chiba (JP); Toshiyuki Koike, Chiba (JP); Yoshihisa Tange, Chiba (JP); Atsushi Sakurai, Chiba (JP)

(73) Assignee: Seiko Instruments Inc. (JP)

( * ) Notice: Subject to any disclaimer, the term of this patent is extended or adjusted under 35 U.S.C. 154(b) by 390 days.

(21) Appl. No.: 12/231,261

(22) Filed: Aug. 28, 2008

(65) Prior Publication Data

US 2009/0079395 A1 Mar. 26, 2009

(30) Foreign Application Priority Data

Aug. 29, 2007 (JP) ................................. 2007-222664

(51) Int. Cl.
*H02J 7/00* (2006.01)

(52) U.S. Cl. ...................... 320/134; 320/135; 320/136

(58) Field of Classification Search .................. 320/131, 320/134, 136
See application file for complete search history.

(56) References Cited

U.S. PATENT DOCUMENTS

| 6,373,227 | B2 * | 4/2002 | Nakashimo | 320/134 |
| 2002/0050806 | A1 * | 5/2002 | Fujiwara | 320/136 |
| 2005/0068008 | A1 * | 3/2005 | Zhang | 320/134 |

* cited by examiner

*Primary Examiner* — Edward Tso
*Assistant Examiner* — Samuel Berhanu
(74) *Attorney, Agent, or Firm* — Adams & Wilks

(57) ABSTRACT

A charge and discharge control circuit which accommodates pulsed charge and pulsed discharge and can control charge and discharge of a secondary battery with safety, and a rechargeable power supply device having the same built therein are provided. The charge and discharge control circuit includes a delay time switching circuit for shortening a delay time of overcharge detection after charge inhibition is canceled. When overcharge is detected after the charge inhibition is canceled, the charge is inhibited in a delay time which is shorter than a normal delay time of the overcharge detection.

5 Claims, 3 Drawing Sheets

CHARGE AND DISCHARGE CONTROL CIRCUIT AND RECHARGEABLE POWER SUPPLY DEVICE

BACKGROUND OF THE INVENTION

1. Field of the Invention

The present invention relates to a charge and discharge control circuit for controlling charge and discharge of a secondary battery, and to a rechargeable power supply device having the charge and discharge control circuit built therein.

2. Description of the Related Art

In recent years, as electronic equipment is downsized and becomes portable, a secondary battery is increasingly used. A lithium secondary battery is the most widely used secondary battery. Many problems with the lithium secondary battery are pointed out, including breakage, deterioration, and the shorter life of the battery due to overcharge and overdischarge. Among others, an overcharged lithium secondary battery which is charged beyond a safe battery voltage range may overheat and explode, and thus, a charge and discharge control circuit for protecting the lithium secondary battery is required to be highly reliable. Further, because the charge and discharge control circuit is mainly built in a battery for portable equipment, downsizing of the circuit is obviously indispensable.

The charge and discharge control circuit detects an overcharged state, an overdischarged state, an overcurrent state, or the like and controls charge and discharge currents. Generally, in order to avoid malfunction under the influence of noise or the like, when those states are detected, a charge and discharge control circuit confirms the detection after a certain delay time corresponding to each state. Generally, the delay time for overcharge detection is set to be several hundred milliseconds to several seconds.

However, when a charge current is intermittently supplied in a pulse-like manner, overcharge cannot be accurately detected in some cases. FIG. 4 is a graph of voltage across the secondary battery when the charge current is supplied in the pulse-like manner. The charge current is supplied during a time period tH while the charge current is not supplied during a time period tL. tCU is a delay time in detecting overcharge. During the time period tH, because the current flows through an internal impedance of the secondary battery, the voltage across the secondary battery is higher than a charge inhibition voltage. Meanwhile, during the time period tL, because the current does not flow, the voltage across the secondary battery is lower than the charge inhibition voltage. Here, if tCU>tH, then the voltage across the secondary battery goes down below the charge inhibition voltage during the delay time, and thus, an overcharge detection signal is reset. Because the overcharge is not detected, the charge and discharge control circuit cannot inhibit the charge.

In order to solve the problem, a method of controlling a charge and discharge control circuit as illustrated in FIG. 5 has been proposed (see Japanese Patent Application Laid-open No. 2003-257502). In the method of controlling a charge and discharge control circuit illustrated in FIG. 5, a neglect time which is longer than the time period tL is provided in the delay time tCU. This makes it possible for the charge and discharge control circuit to inhibit the charge even if the voltage across the secondary battery temporarily goes down below the charge inhibition voltage during the delay time tCU insofar as the time period during which the voltage is below the charge inhibition voltage is the time period tL illustrated in FIG. 5.

However, the method of controlling a charge and discharge control circuit as illustrated in FIG. 5 has the following problem. When both charge in a pulse-like manner and discharge in a pulse-like manner are carried out simultaneously, the charge is inhibited once, but, soon after that, the charge inhibition is canceled. This phenomenon is illustrated in FIG. 6. After the charge is inhibited because of the overcharge detection, when pulsed discharge makes the voltage across the secondary battery go down below a charge inhibition cancellation voltage, the charge inhibition state is canceled. When the charge inhibition state is canceled, a charger again starts the charge, and the voltage across the battery is raised again during the delay time tCU. One way to avoid this problem is thought to be lowering the charge inhibition cancellation voltage.

FIG. 7 is a block diagram of a typical rechargeable power supply device. A rechargeable power supply device 1 includes a secondary battery 2, a charge and discharge control circuit 100, and a charge and discharge current control circuit 10. In the charge inhibition state, a transistor 12 for charge control is off, and thus, a discharge current flows via a parasitic diode 14 of the transistor 12 for charge control. When the amount of the discharge current is large, an excessively heavy load is applied to the parasitic diode 14, which may result in deterioration or breakage. Accordingly, the method of avoiding cancellation of the charge inhibition due to pulsed discharge by lowering the charge inhibition cancellation voltage is not preferred from the viewpoint of securing the safety of the rechargeable power supply device.

SUMMARY OF THE INVENTION

The present invention has been made in view of the above-mentioned problem, and therefore an object of the present invention is to provide a charge and discharge control circuit which accommodates pulsed discharge, and to control charge and discharge of a secondary battery with safety. Another object of the present invention is to provide a small rechargeable power supply device with excellent portability without excessively increasing the footprint of the charge and discharge control circuit in order to solve the above-mentioned problem.

In order to solve the conventional problem, according to an aspect of the present invention, a charge and discharge control circuit and a rechargeable power supply device having the same built therein are structured as follows.

According to the present invention, a charge and discharge control circuit for controlling charge and discharge of a secondary battery includes: overcharge voltage detection means; delay means for outputting, after receiving a signal output by the overcharge voltage detection means, the signal after a certain delay time is counted; and delay time switching means for switching, after receiving the signal output by the overcharge voltage detection means and the signal output by the delay means, the certain delay time of the delay means. The delay means includes switching means for counting a first delay time and a second delay time shorter than the first delay time. After charge inhibition is canceled from a charge inhibition state due to overcharge, the delay time switching means outputs to the delay circuit a signal for switching to the second delay time. The delay means detects overcharge during the second delay time.

Further, a rechargeable power supply device according to the present invention includes: a secondary battery; a charge and discharge current control circuit; and the charge and discharge control circuit described above having voltage detection terminals connected to terminals at both ends of the secondary battery, and control signal output terminals connected to the charge and discharge current control circuit. The secondary battery and the charge and discharge current control circuit are connected in series to terminals to which a charger/discharger is connected.

According to the present invention, the charge and discharge control circuit which accommodates pulsed discharge is provided, and charge and discharge of the secondary battery can be controlled with safety. Further, the small rechargeable power supply device with excellent portability having the charge and discharge control circuit built therein can be provided without excessively increasing the footprint of the charge and discharge control circuit.

DETAILED DESCRIPTION OF THE PREFERRED EMBODIMENT

Figure 1:
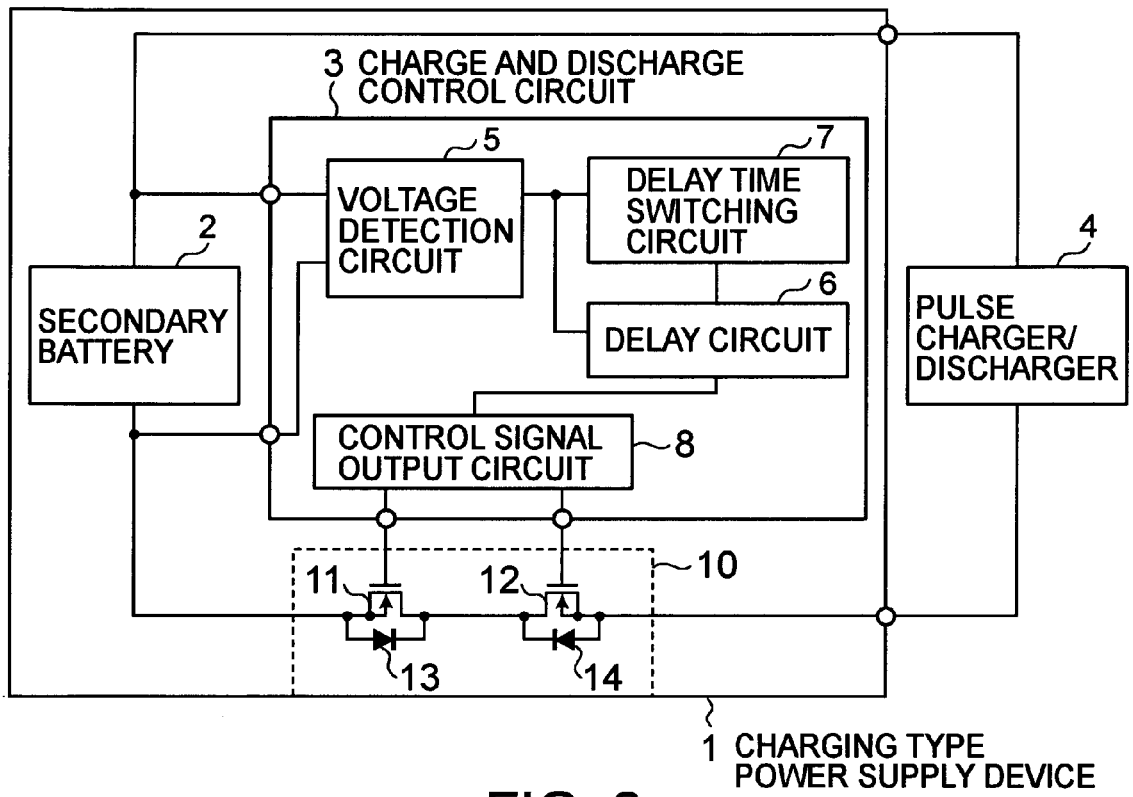
FIG. 1 is a block diagram of a charge and discharge control circuit and a rechargeable power supply device having the same built therein according to an embodiment of the present invention.

FIG. 1 is a block diagram of a charge and discharge control circuit and a rechargeable power supply device having the same built therein according to an embodiment of the present invention.

A rechargeable power supply device 1 according to this embodiment includes a secondary battery 2, a charge and discharge control circuit 3, and a charge and discharge current control circuit 10. The charge and discharge control circuit 3 includes a voltage detection circuit 5, a delay circuit 6, a delay time switching circuit 7, and a control signal output circuit 8. The charge and discharge current control circuit 10 includes a transistor 11 for discharge control and a transistor 12 for charge control.

Terminals at both ends of the secondary battery 2 are connected to voltage detection terminals of the charge and discharge control circuit 3, and the charge and discharge current control circuit 10 is connected to control signal output terminals of the charge and discharge control circuit 3. The charge and discharge control circuit 3 includes the voltage detection circuit 5 for detecting an overcharge voltage and an overdischarge voltage across the secondary battery 2. The voltage detection circuit 5 according to this embodiment detects the overcharge voltage. When the voltage detection circuit 5 detects the overcharge voltage, a detection signal is input to the delay circuit 6. After a certain delay time, the delay circuit 6 outputs the detection signal to the control signal output circuit 8. According to the detection signal, the control signal output circuit 8 outputs a charge/discharge control signal to the charge and discharge current control circuit 10.

Here, the delay circuit 6 has a function of switching the delay time according to a signal from the delay time switching circuit 7. The delay time switching circuit 7 outputs to the delay circuit 6 a signal for switching the delay time of the delay circuit 6 according to a signal from the voltage detection circuit 5 and a signal from the delay circuit 6. Specifically, after the cancellation of the charge inhibition, the delay time switching circuit 7 outputs to the delay circuit 6 a signal for switching to a second delay time which is shorter than a first delay time as a normal delay time. According to the signal, the delay circuit 6 detects overcharge during the second delay time. The delay circuit 6 also counts a certain length of time, which is shorter than the first delay time and longer than the second delay time, with a timer for recovering to the first delay time. The timer begins to count the certain length of time when the charge inhibition is canceled, and the timer is reset when overcharge is detected during the count. When the timer completes the count before overcharge is detected, the delay circuit 6 outputs a signal to the delay time switching circuit 7, which makes the delay time switching circuit 7 stop outputting the signal for switching to the second delay time.

Figure 2:
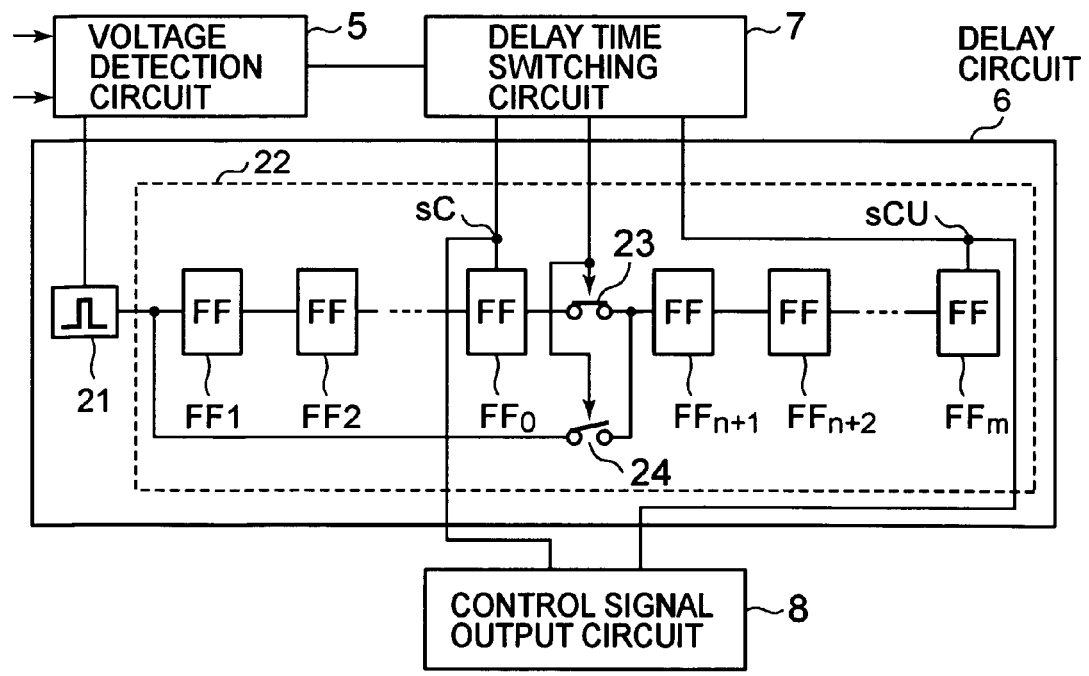
FIG. 2 is a block diagram illustrating an exemplary delay circuit of the charge and discharge control circuit according to this embodiment.

FIG. 2 is a block diagram illustrating an exemplary delay circuit of the charge and discharge control circuit according to this embodiment.

The delay circuit 6 includes an oscillation circuit 21 for counting delay time, a frequency division circuit 22, and switches 23 and 24. The frequency division circuit 22 includes flip-flop circuits FF in a plurality of stages.

An output of the oscillation circuit 21 is connected to a flip-flop circuit FF1 and the switch 24. The frequency division circuit 22 is divided by the switch 23 into flip-flop circuits FF1 to FFn and flip-flop circuits FFn+1 to FFm. Connection is made such that an input to the flip-flop circuit FFn+1 can be selected from a signal from the flip-flop circuit FFn via the switch 23 and a signal from the oscillation circuit 21 via the switch 24. Further, an output from the flip-flop circuit FFn and an output from the flip-flop circuit FFm are connected to the delay time switching circuit 7 and the control signal output circuit 8. Start and stop of operation of the oscillation circuit 21 are controlled by a signal from the voltage detection circuit 5. Opening and closing of the switches 23 and 24 are controlled by a signal from the delay time switching circuit 7.

The charge and discharge control circuit 3 as illustrated in FIG. 2 operates as follows and has a function of protecting the circuit from overcharge due to a pulsed discharge current.

First, when overcharge due to charge from a low voltage is detected, a signal is output from the voltage detection circuit 5 to the oscillation circuit 21, and oscillation starts. Further, a signal is output from the voltage detection circuit 5 to the delay time switching circuit 7. Here, because the detection is normal overcharge detection, the delay time switching circuit 7 controls the switch 23 to close and controls the switch 24 to open. Specifically, after a first delay time tCU1 passes, a first delay signal sCU1 is output from the flip-flop circuit FFm. When the voltage detection circuit 5 continues to detect overcharge during the first delay time tCU1, the delay circuit 6 outputs the first delay signal sCU1 to the control signal output circuit 8. Therefore, the charge and discharge control circuit 3 controls the transistor 12 for charge control so as to inhibit charge.

Then, when the charge inhibition is canceled from the charge inhibition state due to discharge, a signal is output from the voltage detection circuit 5 to the oscillation circuit 21 to start oscillation. Further, a signal is output from the voltage detection circuit 5 to the delay time switching circuit 7. Here, because the charge inhibition is canceled, the delay time switching circuit 7 controls the switches 23 and 24 to open. Specifically, after a timer time tC passes, a timer signal sC is output from the flip-flop circuit FFn, and no signal is sent to the flip-flop circuit FFn+1 and thereafter.

Here, after the timer time tC passes with the charge inhibition being canceled, the delay time switching circuit 7 is reset to its normal state of waiting for overcharge detection. When overcharge is detected before the timer time tC passes, a signal is output from the voltage detection circuit 5 to the delay time switching circuit 7. Because the overcharge is detected after the charge inhibition is canceled, the delay time switching circuit 7 controls the switch 24 to close, and thus, a signal from the oscillation circuit 21 is sent to the flip-flop circuit FFn+1 and thereafter. Specifically, after a second delay time tCU2 passes, a second delay signal sCU2 is output from the flip-flop circuit FFm. When the voltage detection circuit 5 continues to detect overcharge during the second delay time tCU2, the delay circuit 6 outputs the second delay signal sCU2 to the control signal output circuit 8. Therefore, the charge and discharge control circuit 3 controls the transistor 12 for charge control so as to inhibit charge.

Here, the first delay time tCU1, the second delay time tCU2, and the timer time tC are set so as to satisfy the following relationship: tCU1>tC>tCu2.

Figure 3:
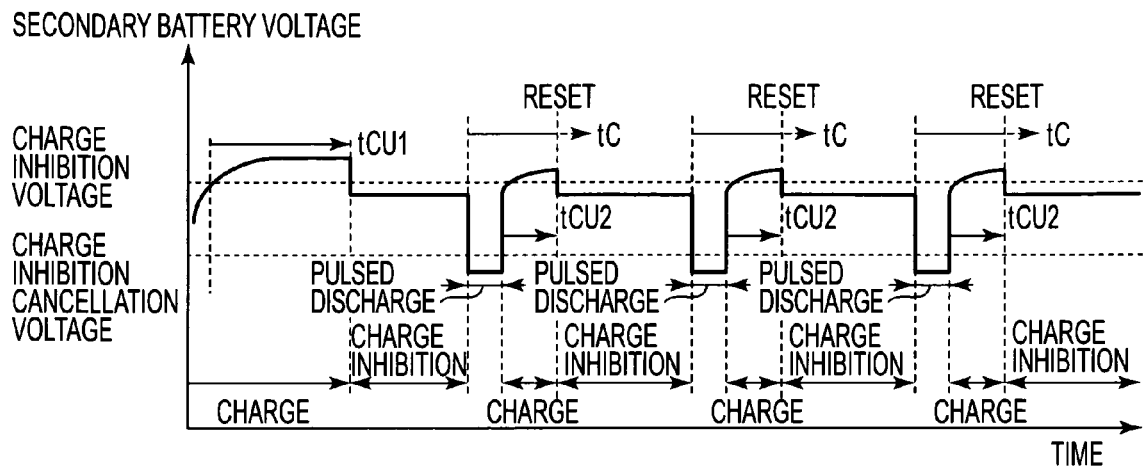
FIG. 3 is a graph of voltage across a secondary battery when the rechargeable power supply device having the charge and discharge control circuit built therein according to this embodiment is connected to a pulse charger/discharger.
Figure 4:
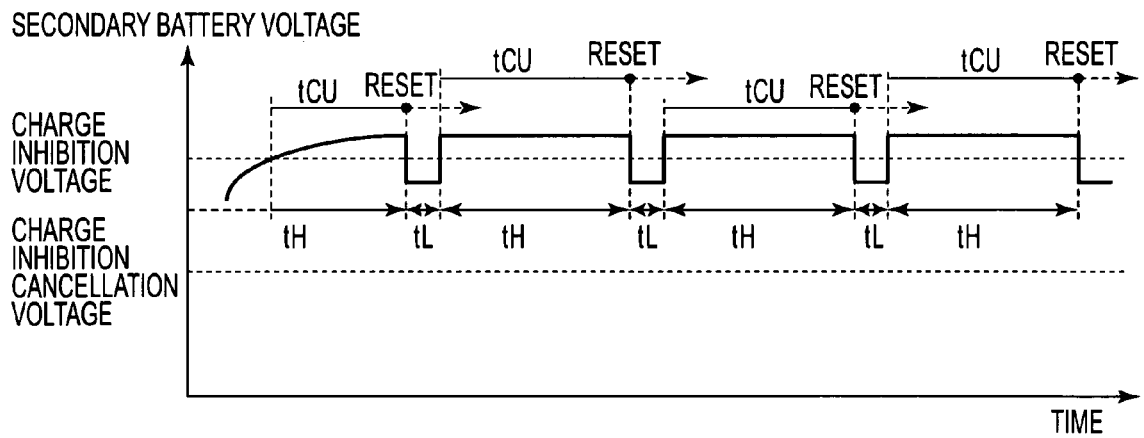
FIG. 4 is a graph of voltage across a secondary battery when a charge current is supplied in a pulse-like manner to a rechargeable power supply device having a conventional charge and discharge control circuit built therein.
Figure 5:
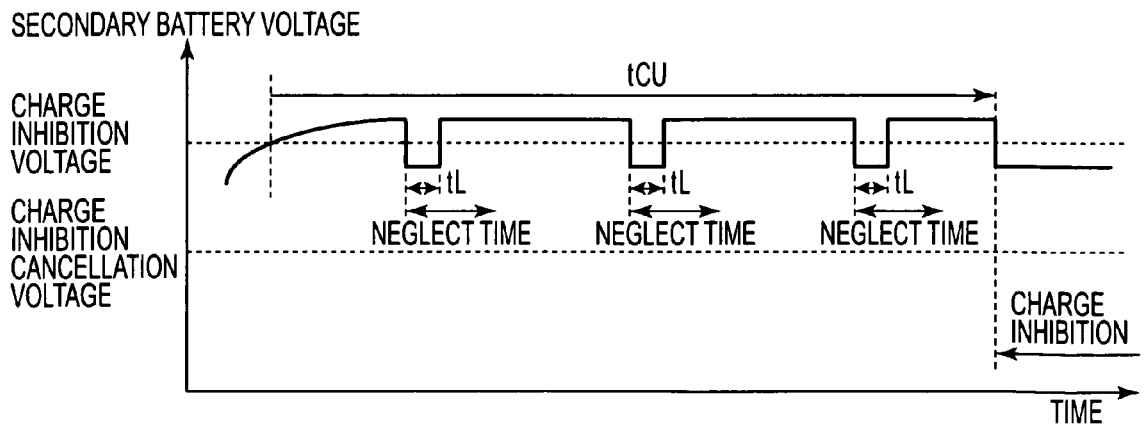
FIG. 5 is a graph of voltage across the secondary battery when the charge current is supplied in the pulse-like manner to the rechargeable power supply device having the conventional charge and discharge control circuit built therein.
Figure 6:
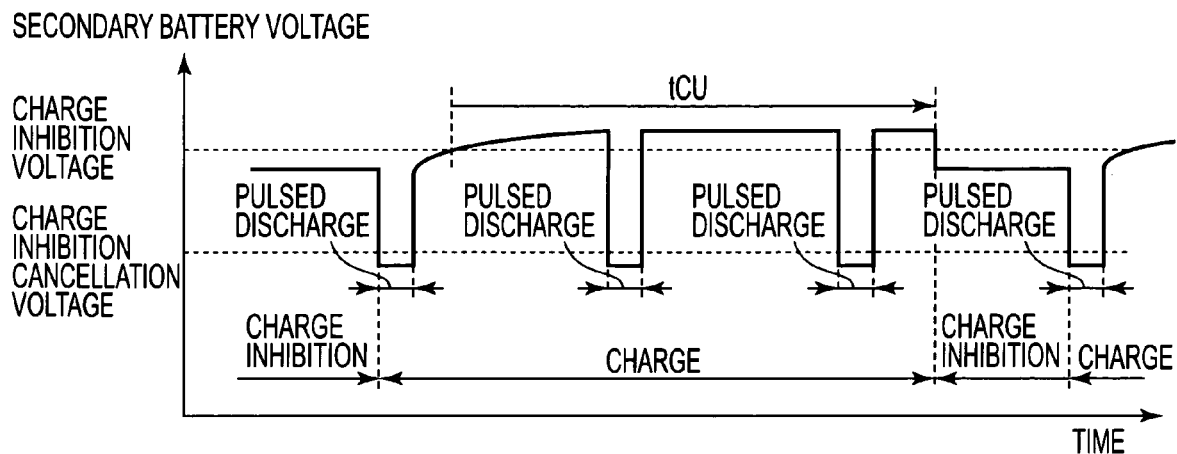
FIG. 6 is a graph of voltage across the secondary battery when the rechargeable power supply device having the conventional charge and discharge control circuit built therein is connected to a pulse charger/discharger.
Figure 7:
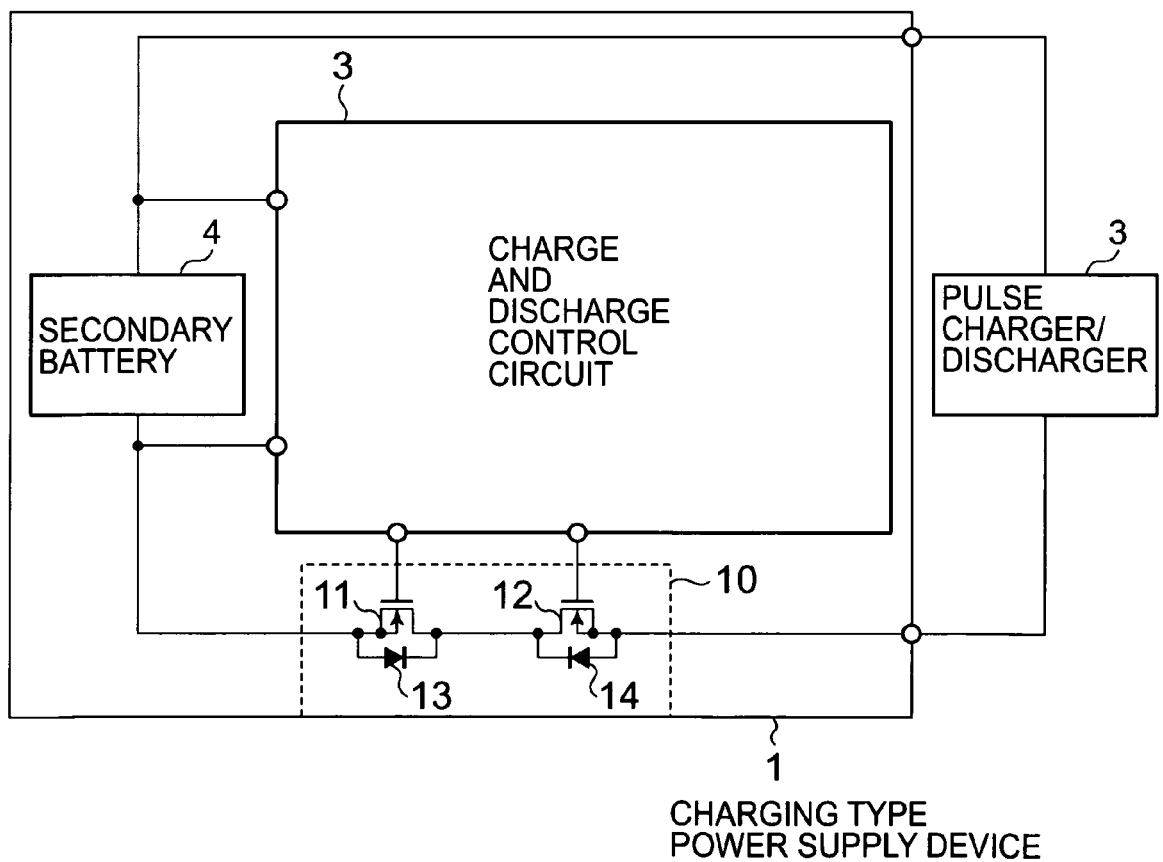
FIG. 7 is a block diagram of a typical rechargeable power supply device.

FIG. 3 is a graph of the voltage across the secondary battery 2 when the rechargeable power supply device 1 having the charge and discharge control circuit 3 described above built therein is connected to a pulse charger/discharger 4. When the rechargeable power supply device 1 is connected to the pulse charger/discharger 4, the voltage across the secondary battery 2 is controlled as illustrated in FIG. 3, and thus, charge and discharge of the secondary battery can be controlled with safety.

Further, by forming the charge and discharge control circuit as illustrated in FIG. 2, that is, by dividing the frequency division circuit 22, tC and tCU2 can be simultaneously counted, and thus, a small rechargeable power supply device with excellent portability can be provided without excessively increasing the footprint of the charge and discharge control circuit.

What is claimed is:

1. A charge and discharge control circuit for controlling charge and discharge of a secondary battery, comprising:
   overcharge voltage detection means;
   delay means for outputting, after receiving a signal output by the overcharge voltage detection means, the signal after a certain delay time is counted; and
   delay time switching means for switching, after receiving the signal output by the overcharge voltage detection means and the signal output by the delay means, the certain delay time of the delay means, wherein:
   the delay means comprises switching means for counting a first delay time and a second delay time shorter than the first delay time;
   after charge inhibition is canceled from a charge inhibition state due to overcharge, the delay time switching means outputs to the delay circuit a signal for switching to the second delay time; and
   the delay means detects overcharge during the second delay time.

2. A charge and discharge control circuit according to claim 1, wherein:
   the delay means further comprises timer means for recovering from the second delay time to the first delay time; and
   after the timer means completes count, overcharge is detected during the first delay time.

3. A charge and discharge control circuit according to claim 2, wherein the timer means counts a timer time which is shorter than the first delay time and longer than the second delay time.

4. A charge and discharge control circuit according to claim 2, wherein:
   the delay means further comprises a plurality of flip-flop circuits and a switch circuit; and
   by dividing the plurality of flip-flop circuits by the switch circuit, the second delay time and the timer time are simultaneously counted.

5. A rechargeable power supply device, comprising:
   a secondary battery;
   a charge and discharge current control circuit; and
   the charge and discharge control circuit according to any one of claims 1 to 4 having voltage detection terminals connected to terminals at both ends of the secondary battery, and control signal output terminals connected to the charge and discharge current control circuit,
   wherein the secondary battery and the charge and discharge current control circuit are connected in series to terminals to which a charger/discharger is connected.

* * * * *